(12) United States Patent
Holmes et al.

(10) Patent No.: US 8,974,338 B2
(45) Date of Patent: Mar. 10, 2015

(54) TWO-MODE ELECTRICALLY-VARIABLE TRANSMISSION WITH OFFSET MOTOR AND TWO PLANETARY GEAR SETS

(75) Inventors: Alan G. Holmes, Clarkston, MI (US); Brendan M. Conlon, Rochester Hills, MI (US); Norman Schoenek, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 365 days.

(21) Appl. No.: 13/488,946

(22) Filed: Jun. 5, 2012

(65) Prior Publication Data
US 2013/0324340 A1    Dec. 5, 2013

(51) Int. Cl.
*F16H 3/56*      (2006.01)
*F16H 3/72*      (2006.01)
*F16H 48/22*    (2006.01)

(52) U.S. Cl.
USPC ................................ 475/5; 475/218; 475/330

(58) Field of Classification Search
USPC ............. 475/5, 200, 204–206, 218, 219, 329, 475/330
See application file for complete search history.

(56) References Cited

U.S. PATENT DOCUMENTS

| | | | |
|---|---|---|---|
| 5,931,757 A | 8/1999 | Schmidt | |
| 6,090,005 A | 7/2000 | Schmidt et al. | |
| 8,840,500 B2 * | 9/2014 | Tamai et al. | 475/5 |
| 8,845,469 B2 * | 9/2014 | Buffet | 475/5 |
| 8,864,613 B2 * | 10/2014 | Morrow et al. | 475/5 |

* cited by examiner

*Primary Examiner* — Jacob S Scott
(74) *Attorney, Agent, or Firm* — Quinn Law Group, PLLC

(57) ABSTRACT

A hybrid powertrain has an electrically-variable transmission with a compound planetary gear set that may be only two planetary gear sets. Two members of the first planetary gear set are connected for common rotation with two members of the second planetary gear set. A first motor/generator is connected for common rotation with a member of the first planetary gear set and a member of the second planetary gear set. An input member is connected to another member of the first planetary gear set. A first set of intermeshing gears includes a first gear connected for common rotation with one of the gears of the second planetary gear set and a second gear driven by a second motor/generator. A second set of intermeshing gears includes another gear driving the output member. A first clutch is engageable to establish an input-split mode. A second clutch is engageable to establish a compound-split mode.

20 Claims, 4 Drawing Sheets

TWO-MODE ELECTRICALLY-VARIABLE TRANSMISSION WITH OFFSET MOTOR AND TWO PLANETARY GEAR SETS

TECHNICAL FIELD

The present teachings generally include an electrically-variable transmission having two planetary gear sets and two motor/generators.

BACKGROUND

Hybrid powertrains for vehicles utilize different power sources under different vehicle operating conditions. A hybrid powertrain with an electrically-variable transmission that can provide an input-split operating mode and a separate compound-split operating mode typically has three planetary gear sets and one or more motor/generators. The input-split operating mode has a single transmission ratio where the motor/generators do not need to supply mechanical power to allow power to be transmitted from the input to the output, and the compound-split operating mode has two such ratios. That is, at one particular ratio of input speed over output speed in the input-split mode and two particular ratios in the compound-split mode, power is transmitted from input to output without conversion of any of it into electrical power and back again. Each of these particular transmission ratios, where power is transmitted mechanically, is sometimes called a "mechanical point". Different operating modes are established by engaging brakes and/or clutches in different combinations and controlling the engine and motor/generators. Power-split operating modes are advantageous, as they may be used to improve fuel economy by allowing the engine to operate at its most fuel efficient speed. However, the additional components required for a hybrid powertrain, such as the planetary gear sets, brakes and/or clutches, may increase overall vehicle cost and packaging space requirements.

SUMMARY

A hybrid powertrain is provided with an electrically-variable transmission that has a compound planetary gear set that may be only two planetary gear sets. The transmission has two motor/generators, and two sets of intermeshing gears with offset gears, allowing one of the motor/generators to be offset from the axis of rotation of the planetary gear sets. With only two planetary gear sets and offset gearing used in lieu of a third planetary gear set, the overall length of the transmission is relatively short, and is suitable for a front-wheel drive vehicle, although the transmission is not limited to front-wheel drive vehicles. Two torque-transmitting mechanisms are engageable in different combinations to provide both an input-split operating mode, and a compound-split operating mode. In one embodiment, the range of speed ratios provided in the input-split operating mode is disjoint from the range of speed ratios provided in the compound-split operating mode. That is, the speed ratios achieved in the input-split operating mode from launch to the mechanical point are separated by an interval of ratios from the speed ratios achieved in the compound-split operating mode between its two mechanical points.

Specifically, in one embodiment, a hybrid powertrain has an electrically-variable transmission with only two planetary gear sets including a first planetary gear set and a second planetary gear set. Two members of the first planetary gear set are each connected for common rotation with a different respective member of the second planetary gear set. As used herein "common rotation" means rotation at the same speed and in the same direction. A first motor/generator is connected for common rotation with a member of the first planetary gear set and a member of the second planetary gear set. As used herein, a motor/generator is an electric motor that can be controlled to operate as a motor and alternatively as a generator. An input member is connected to another member of the first planetary gear set. A first set of intermeshing gears includes a first gear connected for common rotation with one of the gears of the second planetary gear set and a second gear driven by a second motor/generator. A second set of intermeshing gears includes another gear driving the output member. A first clutch is selectively engageable to transfer torque from the planetary gear sets to the output member through both of the first set of intermeshing gears and the second set of intermeshing gears. A second clutch is selectively engageable to transfer torque from the planetary gear sets to the output member through the second set of intermeshing gears.

The above features and advantages and other features and advantages of the present teachings are readily apparent from the following detailed description of the best modes for carrying out the present teachings when taken in connection with the accompanying drawings.

DETAILED DESCRIPTION

Figure 1:
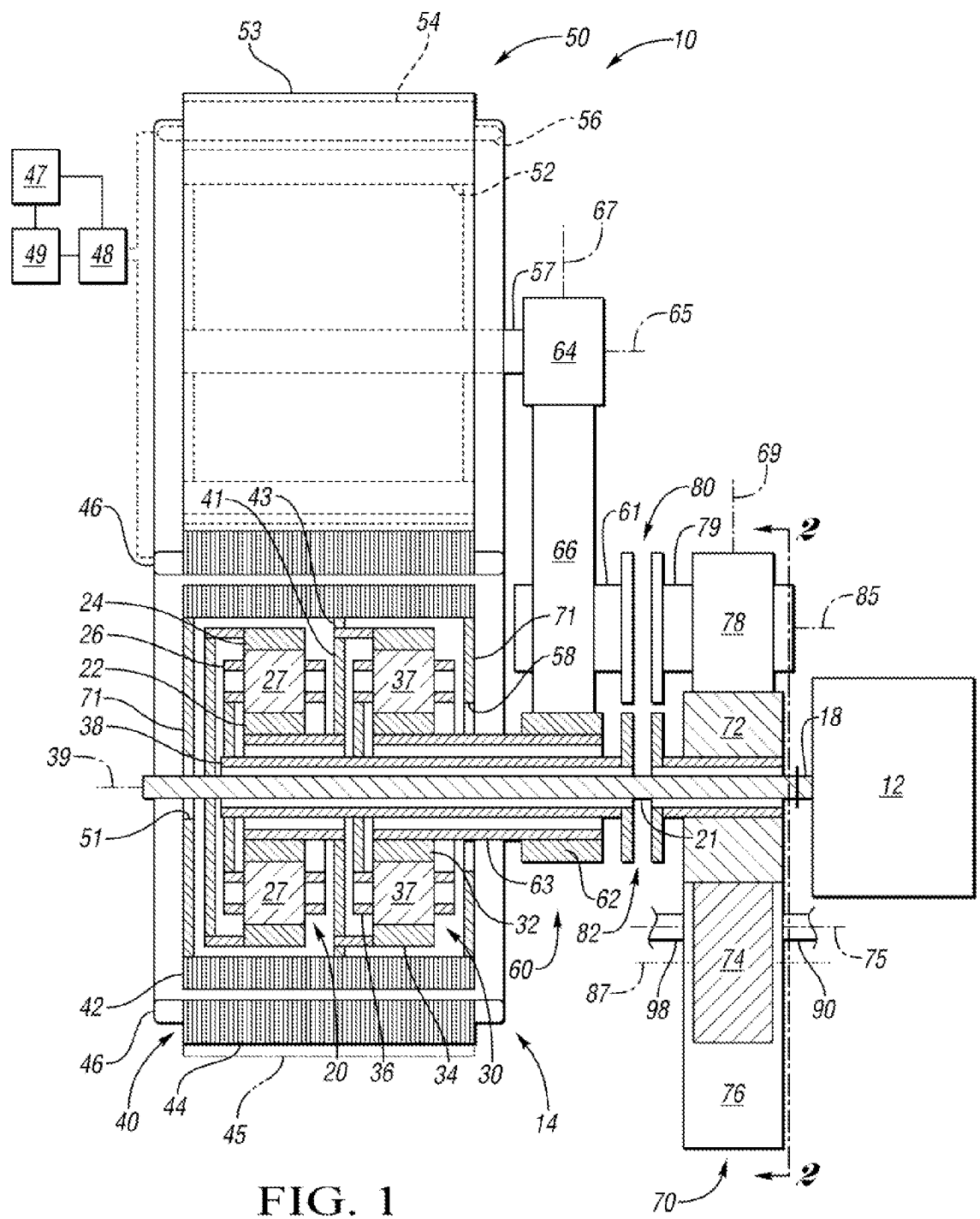
FIG. 1 is a schematic illustration of a first powertrain with an electrically-variable transmission in partial cross-sectional side view taken at the lines 1-1 in FIG. 2.

Referring to the drawings, wherein like reference numbers refer to like components, FIG. 1 shows a powertrain 10 that includes a power source, which in this embodiment is an engine 12, operatively connected to an electrically-variable transmission 14. The engine 12 has an output member 18, such as a crankshaft, that is operatively connected for rotation with an input member 21 of the transmission 14. The crankshaft 18 may be directly connected to the input member 21, or a clutch, a damping member, or a torque converter may be used to connect the engine output member 18 with the input member 21.

The transmission 14 includes a compound planetary gear set that may be a first planetary gear set 20 and a second planetary gear set 30. The transmission 14 also include a first motor/generator 40, a second motor/generator 50, a first set of intermeshing gears 60, a second set of intermeshing gears 70, and first and second torque-transmitting mechanisms 80, 82. With these components, an input-split electrically-variable mode, and a compound-split electrically-variable mode, can be achieved, as described herein. Moreover, the transmission 14 is configured so that the range of speed ratios achieved in the input-split operating mode between launch and its mechanical point does not overlap with the range of speed ratios achieved in the compound-split operating mode between its mechanical points. That is the ranges of speed ratios are disjoint. By providing the sets of intermeshing gears 60, 70 to provide speed reduction to an output member 90 of the transmission 14, only two planetary gear sets 20, 30 are used, and the motor/generators 40, 50, especially the second motor/generator 50, can be relatively small and of low maximum torque. The sets of intermeshing gears 60, 70 enable offset axes of rotation for the second motor/generator 50, the first torque-transmitting mechanism 80, and the output member 90, so that the transmission 14 is suited for packaging in a front wheel-drive vehicle, although the transmission 14 could also be used in rear wheel-drive and all wheel-drive vehicles.

The first planetary gear set 20 includes a sun gear member 22, a ring gear member 24, and a carrier member 26. The carrier member 26 supports a single set of pinion gears 27 that mesh with both the sun gear member 22 and the ring gear member 24. The sun gear member 22 is referred to as the first member, the carrier member 26 is referred to as the second member, and the ring gear member 24 is referred to as the third member of the first planetary gear set 20.

The second planetary gear set 30 includes a sun gear member 32, a ring gear member 34, and a carrier member 36. The carrier member 36 supports a single set of pinion gears 37 that mesh with both the sun gear member 32 and the ring gear member 34. The sun gear member 32 is referred to as the first member, the carrier member 36 is referred to as the second member, and the ring gear member 34 is referred to as the third member of the second planetary gear set 30.

The carrier member 26 and the carrier member 36 are connected for common rotation by a first interconnecting member 38 that forms a first annular shaft and has hub portions connected to the carrier members 26, 36. The interconnecting member 38 may also be referred to as a main shaft, and defines a first axis of rotation 39. All of the members of the planetary gear sets 20 and 30 rotate about the first axis of rotation 39. The sun gear member 22 and the ring gear member 34 are connected for common rotation by a second interconnecting member 41. Because two of the members of the first planetary gear set 20 are connected to rotate at the same speed as two of the members of the second planetary gear set 30, the planetary gear sets 20, 30 are referred to as a compound planetary gear set. As will be understood by those skilled in the art, among the six members of the two planetary gear sets 20, 30 (sun gear member 22, ring gear member 24, carrier member 26, sun gear member 32, ring gear member 34 and carrier member 36), only four distinct rotational speeds are possible, any two of which are linear combinations of the other two. When the planetary gear sets 20, 30 are represented as a lever diagram, as is understood by those skilled in the art, there are only four nodes, with the ring gear member 24 as a first node, referred to as an input node, the connected sun gear member 22 and ring gear member 34 as a second node, the connected carrier members 26, 36 as a compound-split output node, and the sun gear member 32 as an input-split output node.

The sun gear member 32 is connected for common rotation with a first gear 62 of the first set of intermeshing gears 60 by a sleeve shaft 63. The sleeve shaft 63 is a hollow shaft, allowing the interconnecting member 38 to pass through the sleeve shaft 63. The sleeve shaft 63 is concentric with the first interconnecting member 38. A second gear 64 of the first set of intermeshing gears 60 rotates about a second axis of rotation 65. The output member 90 rotates about a third axis of rotation 75. A third gear 66 of the first set of intermeshing gears 60 rotates about a fourth axis of rotation 85 on a second shaft 61. Both the first gear 62 and the second gear 64 mesh with the third gear 66. In any embodiment, all of the gears 62, 64, 66 of the first set of intermeshing gears 60 are arranged so that each of the gears 62, 64, 66 intersects a first plane 67 that is perpendicular to the axes of rotation 39, 65, 85. The first plane 67 is perpendicular to the page in FIG. 1 and indicated in phantom. As can be seen in the end view of FIG. 2, the diameter of the third gear 66 is much larger than the portion visible in FIG. 1.

As shown in FIG. 1, the second set of intermeshing gears 70 is arranged generally parallel to the first set of intermeshing gears 60 and includes a first gear 72, a second gear 74, a third gear 76 and a fourth gear 78 connected to rotate on a third shaft 79 aligned with the second shaft 61. The first gear 72 rotates about the axis of rotation 39 and meshes with the second gear 74, which rotates about a fifth axis of rotation 87. The second gear 74 also meshes with the third gear 76, which rotates about the third axis of rotation 75. The second gear 74 serves as an idler gear to ensure that the third gear 76 rotates in the same direction as the interconnecting member 38 so that the output member 90 rotates in the intended direction (forward or reverse). The first axis of rotation 39, the third axis of rotation 75 and the fourth axis of rotation 85 are arranged in a triangular formation 89 shown in phantom in FIG. 2. All of the gears 72, 74, 76, 78 of the second set of intermeshing gears 70 are arranged to intersect a second plane 69 that is perpendicular to the axes of rotation 39, 65, 75, 85 and 87. The second plane 69 is perpendicular to the page in FIG. 1 and indicted in phantom.

The first motor/generator 40 and the second motor/generator 50 are controllable to function as motors or as generators, or are unpowered, as required to accomplish various desired operating modes of the electrically-variable transmission 14. The motor/generator 40 includes an annular rotor 42 that is concentric with and radially surrounds first and the second planetary gear sets 20, 30. The rotor 42 has a rotor hub 43 that is connected to the interconnecting member 41 so that the rotor 42 rotates commonly with the sun gear member 22 and the ring gear member 34 about the first axis of rotation 39. Openings 51, 58 in rotor supports 71 allow the input member 21, the interconnecting member 38, and the sleeve shaft 63 to pass through the rotor supports 71.

The motor/generator 40 also includes a stator 44 mounted to a stationary member such as a motor casing 45 shown only partially in phantom. The motor casing 45 is referred to as a stationary member as it is a nonrotating member. The stator 44 surrounds the rotor 42 to define a predetermined annular gap between the stator 44 and the rotor 42. Electrical windings 46 extend from the ends of the stator 44 and are operatively connected to a stored energy device 47, such as a battery, that provides electrical energy to or receives electrical energy from the stator 44 through a power inverter 48 according to a stored algorithm in an electrical controller 49.

Figure 3:
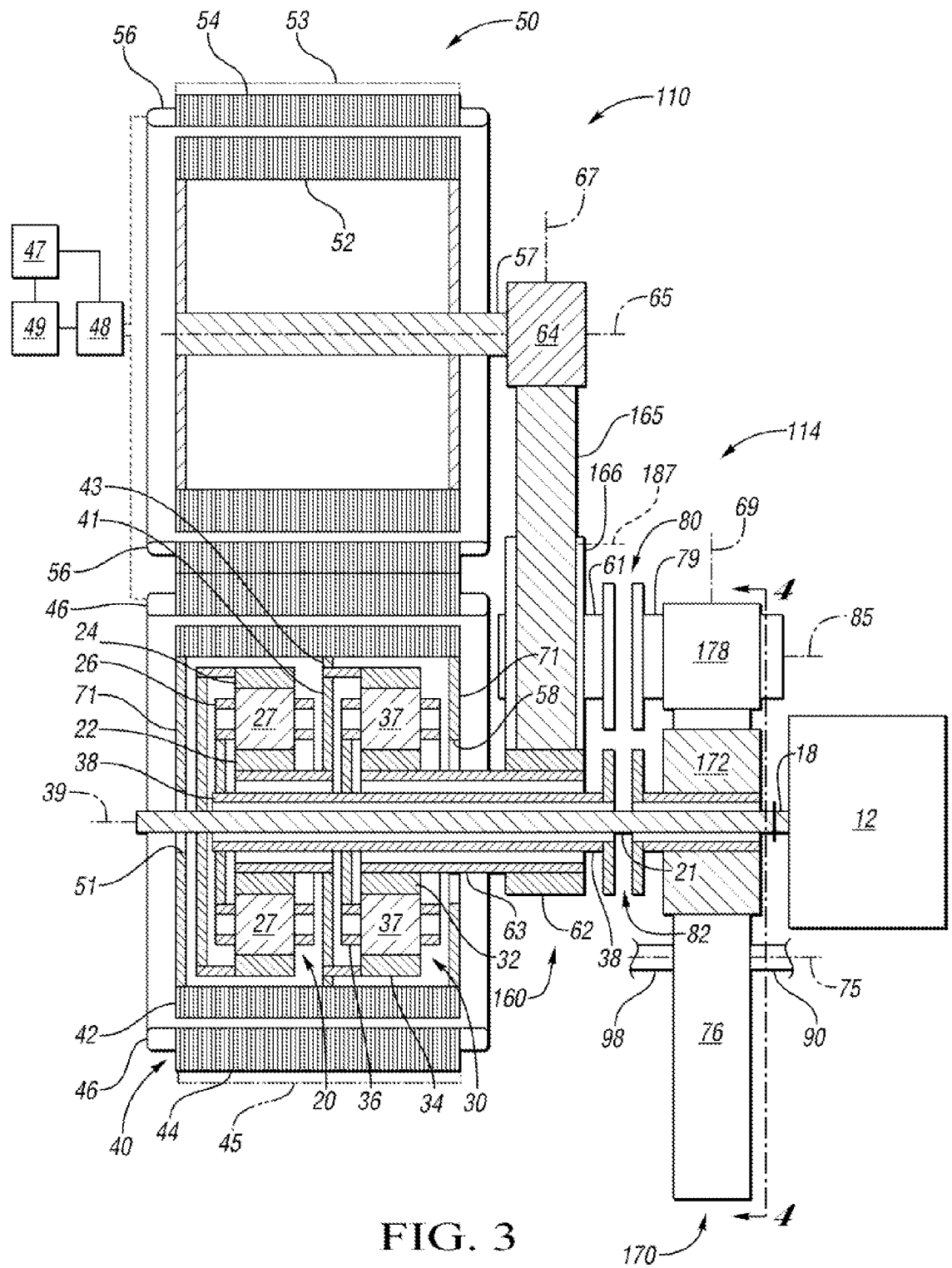
FIG. 3 is a schematic illustration of a second powertrain with an electrically-variable transmission in partial cross-sectional side view taken at the lines 3-3 in FIG. 4.

As best shown in FIG. 3, the second motor/generator 50 has a rotor 52 surrounded by a stator 54 that has electrical windings 56 that extend from ends of the stator 54 and are operatively connected to the stored energy device 47 in the same manner as the stator 44. In FIG. 1, a motor casing 53 surrounds the rotor 52 and stator 54. The motor casing 53 is shown only partially in phantom in FIG. 3. The rotor 52 rotates about the axis of rotation 65 and has an axially extending rotor shaft 57 that connects the rotor 52 for common rotation with the second gear 64. Because it is offset from the first axis of rotation 39, the motor/generator 50 need not surround the planetary gear sets 20, 30 or any of the other components of the transmission 14. The intermeshing gears 64, 66 reduce the speed of and multiply the torque of the rotor 52 from the shaft 57 to the shaft 61, allowing the motor/generator 50 to be a relatively high speed, low torque motor.

The first and second torque-transmitting mechanisms 80, 82 may be friction plate clutches or dog clutches. The torque-transmitting mechanisms 80, 82 are selectively engageable by an actuating mechanism under the control of a controller, which may be the controller 49 or a separate controller. Persons of ordinary skill in the art will readily understand various ways to selectively engage different selectively engageable torque-transmitting mechanisms.

Figure 2:
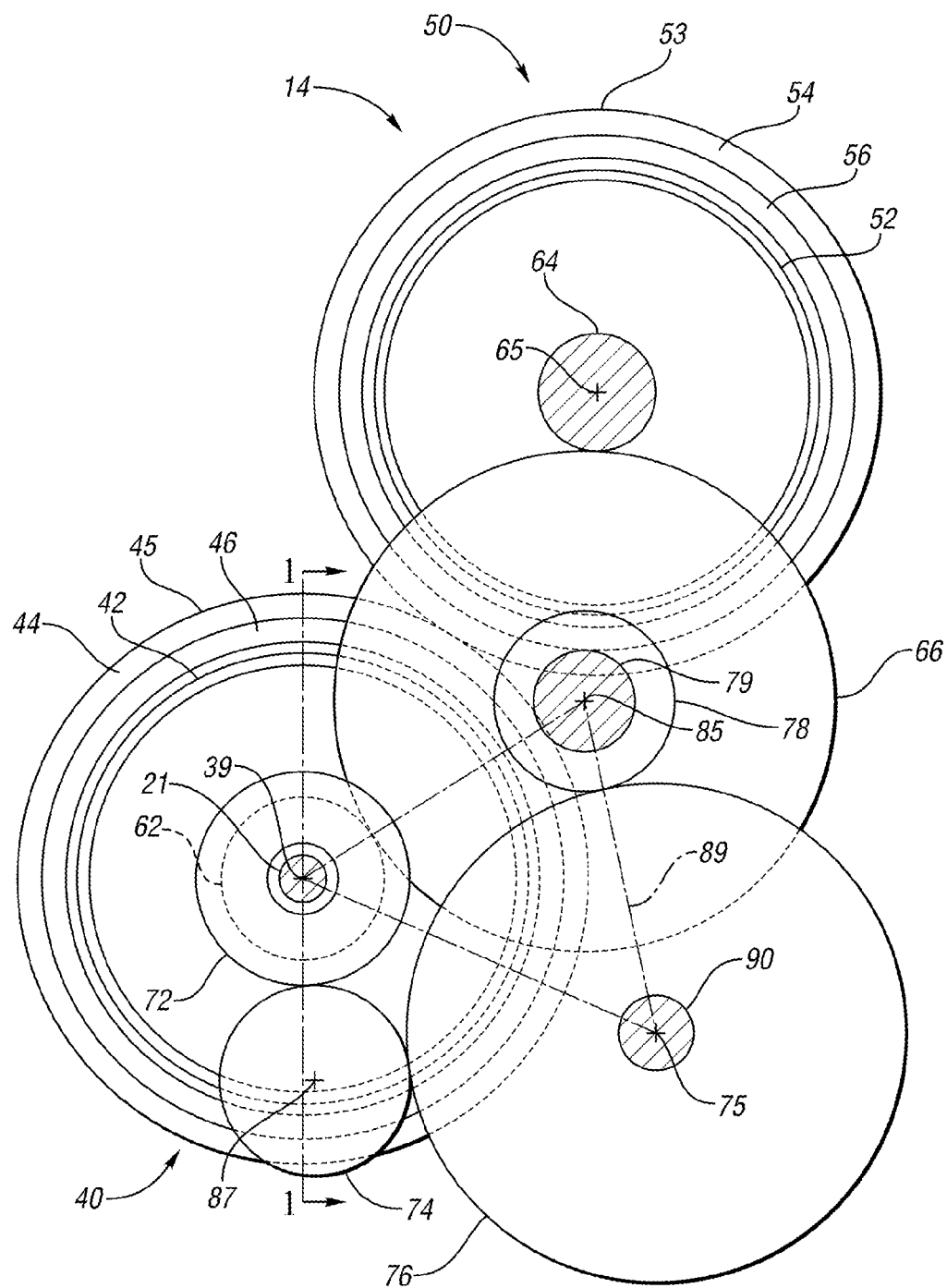
FIG. 2 is a schematic illustration in partial cross-sectional end view of the electrically-variable transmission of FIG. 1 taken at lines 2-2 in FIG. 1.

FIG. 2 shows the transmission 14 in a partial cross-sectional side view. The planetary gear sets 20, 30 are not shown for purposes of clarity in the drawing. The energy storage device 47, power inverter 48 and controller 49 are also not shown. The third gear 76 is an externally-toothed ring gear operatively connected with the output members 90, 98. That is, the third gear 76 is attached to rotate with a differential housing 92. The differential housing 92 is shown with respect to the third gear 76 in FIG. 4 but is not shown in FIG. 2 for purposes of clarity only. Pinion gears 94 are also attached to the differential housing 92 to rotate with the third gear 76. The pinion gears 94 are attached to rotate with one another by a pinion shaft extending vertically between the pinion gears 94, but blocked from view in FIG. 2 by the side gear 96 which meshes with the pinion gears 94. The side gear 96 is connected to rotate with the output member 90 and the vehicle wheel attached thereto. Another like side gear, not visible in FIG. 2, meshes with the pinion gears 94 opposite the side gear 96 and rotates with another output member 98 (shown in FIG. 1) connected to another vehicle wheel. For example, the output member 90 could drive the driver's side front wheel, and the output member 98 could drive the passenger side front wheel.

The powertrain 10 can be controlled to establish a first electrically-variable operating mode that is an input-split operating mode. The engine 12 is on, and the first clutch 80 is engaged. The first and second motor/generators 40, 50 are each separately controlled to operate as a motor or as a generator under the control of the controller 49 during different speed ratios throughout the range of speed ratios of the output member 90 to the input member 21 of the first input-split operating mode.

The engine 12 provides power at the ring gear member 24. The first motor/generator 40 generally operates in the input-split mode as a generator, with the motor/generator 50 functioning as a motor. The motor/generator 50 powers the second gear 64 to thereby add power to the third gear 66. Power flows through both the first set of intermeshing gears 60 and the second set of intermeshing gears 70 through the engaged first clutch 80 to provide torque at the output members 90 and 98. The speed ratio from the sun gear member 32 (the input-split output node) to the output members 90, 98 is dependent upon the gear ratio of the first gear 62 to the third gear 66 and the gear ratio of the fourth gear 78 to the third gear 76. The motor/generator 50 can be a relatively low torque, high speed motor because of the torque multiplication from the second gear 64 to the third gear 66.

The powertrain 10 shifts from the input-split operating mode to a compound-split operating mode by disengaging the first torque-transmitting mechanism 80 just after the second torque-transmitting mechanism 82 has been engaged. Whether shifting from the input-split operating mode to the compound-split operating mode or vice versa, the shifts can be accomplished synchronously, that is without slip and with no theoretical minimum requirements for slip time or shift time. Thus, the third gear 66 is rotating at the same speed as the fourth gear 78 when the first torque-transmitting mechanism 80 is engaged or disengaged, and the interconnecting member 38 is rotating at the same speed as the first gear 72 when the second torque-transmitting mechanism 82 is engaged or disengaged.

In the compound-split operating mode, the first motor/generator 40 is controlled to function as a generator or a motor, depending on the speed ratio, and the second motor/generator 50 is controlled to function as a motor or a generator. Torque is multiplied and speed is reduced through the second set of intermeshing gears 70. The speed ratio from the carrier members 26, 36 (the compound-split output node) to the output members 90, 98 is dependent upon the gear ratios of the first gear 72 to the third gear 76. The range of speed ratios of the input-split operating mode (the range from the speed of the output member 90 of zero to the speed at which the shift occurs synchronously) and the range of speed ratios of the compound-split operating mode (the range from the speed of the output member 90 at which the shift occurs synchronously and all speeds of the output member 90 greater than this shift speed) create a range of ratios between the mechanical point of the input-split mode and the nearest mechanical point of the compound-split mode. That is, the mechanical ratio from the input member 21 to the output member 90 is different at the mechanical point in the input-split operating mode than at either of the mechanical points in the compound-split operating mode.

The electrically-variable transmission 14 thus uses two planes 67, 69 of offset gearing (the intermeshing gear sets 60, 70) and two torque-transmitting mechanisms 80, 82 to achieve operative connection of the desired members of the compounded planetary gear sets 20, 30 to the output member 90, connection of one of the motor/generators 50 to the intermeshing gear set 60 with a speed reduction ratio, and final drive speed reduction from the compounded planetary gear sets 20, 30 to the output member 90 through the intermeshing gear sets 60, 70.

The transmission 14 can also be controlled to provide an electric-only operating mode in which the engine 12 is off, and the motor/generator 50 is controlled to function as a motor to provide torque to drive the output members 90, 98 through the first set of intermeshing gears 60 and the second set of intermeshing gears 70 (through gears 78 and 76) when the first torque-transmitting mechanism 80 is engaged. The motor/generator 40 can be controlled to freewheel to relieve torque on the sun gear member 22 with the rotor 42 spinning at a speed sufficient to cause the ring gear member 24 and the input member 21 to remain stationary. In this manner, the transmission 14 is operated in a one motor electric-only operating mode in which only motor/generator 50 functions as a motor. Alternately, the second motor/generator 50 can function as a generator to provide regenerative braking of the output members 90, 98 to recover electrical power to the energy storage device 47. The electric-only operating mode can be used to launch the vehicle from a stop, i.e., when the speed of the output members 90, 98 is zero. Alternatively, the motor/generator 40 can also be operated to cause the input member 21 to turn in order to start the engine 12, such as after the speed of the output members 90, 98 reaches a predetermined threshold speed following launch in the electric-only operating mode.

The powertrain 10 can be used to provide a fixed ratio operating mode by engaging both of the torque-transmitting mechanisms 80, 82. With both the first interconnecting member 38 and the third gear 66 rotating at a speed proportional to the third gear 76, the speed ratio of the input member 21 to the output members 90, 98 will remain fixed.

Figure 4:
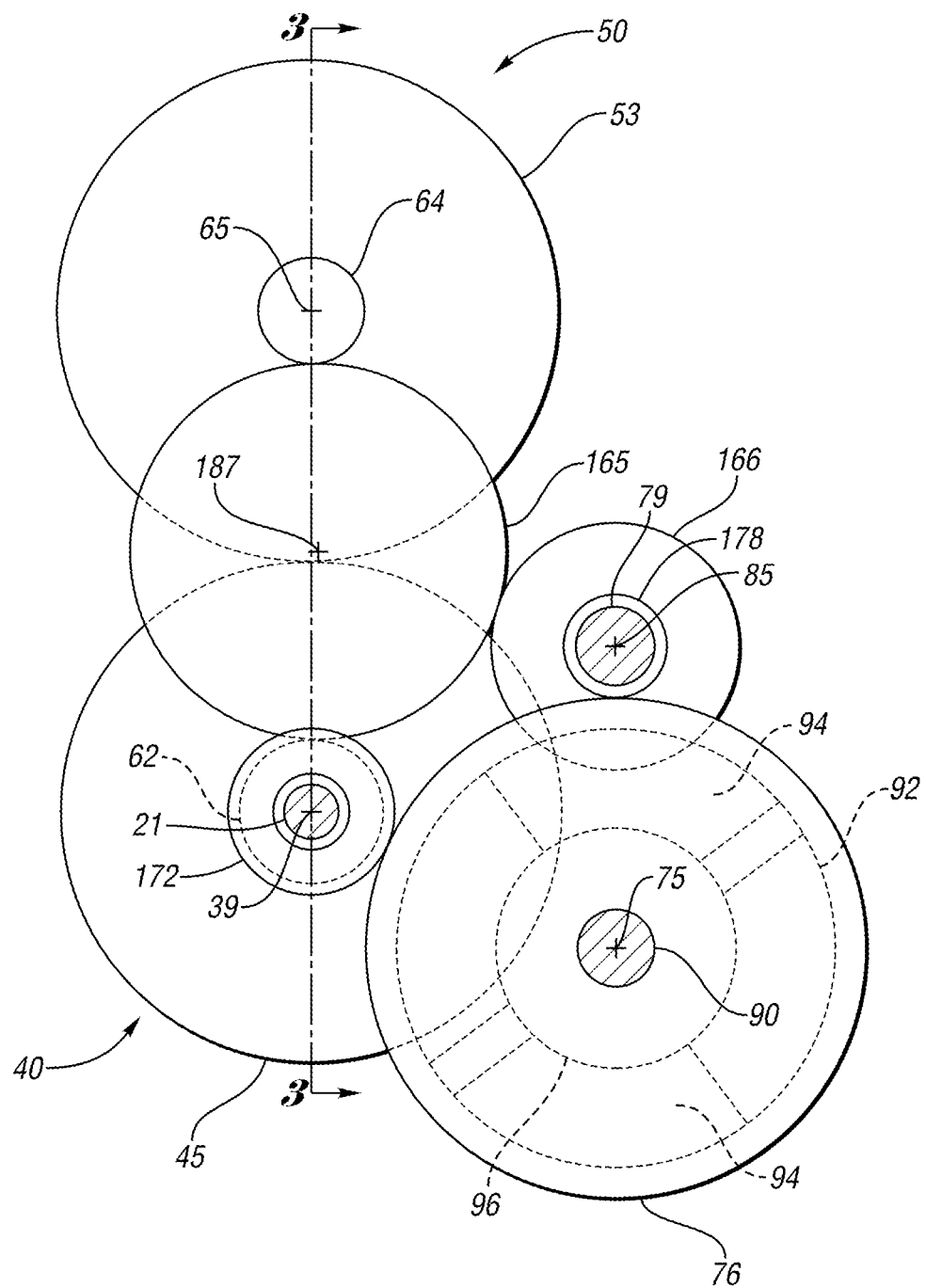
FIG. 4 is a schematic illustration in partial cross-sectional end view of the electrically-variable transmission of FIG. 3 taken at lines 4-4 in FIG. 3.

The powertrain 10 and transmission 14 provide both an input-split operating mode and an output-split operating mode with only two planetary gear sets 20, 30, two torque-transmitting mechanisms 80, 82 and two sets of intermeshing gears 60, 70 arranged in two planes 67, 69. Some of the gears of the sets of intermeshing gears 60, 70 have axes of rotation that are offset from a main axis of rotation (the first axis 39) of the planetary gear sets 20, 30 and the first motor/generator 40. This allows the second motor/generator 50 to be placed off-axis to establish a second axis of rotation 65. The second motor/generator 50 can be placed either at least partially forward of or at least partially rearward of the planetary gear sets 20, 30. In the embodiment of FIGS. 1 and 2, the motor/generator 50 is partially rearward of the motor/generator 40, as shown in FIG. 2. In the embodiment of FIGS. 3 and 4, the motor/generator 50 is substantially aligned directly above the motor/generator 40, as shown in FIG. 4. The overall axial length of the powertrain 10 is shortened relative to a powertrain that uses three planetary gear sets. By placing the second motor/generator 50 as well as some of the gears of the sets of intermeshing gears 60, 70 at least partially forward or rearward of one another, the overall width of the transmission 14 can also be minimized.

FIGS. 3 and 4 show another embodiment of a powertrain 110 that has a second embodiment of an electrically-variable transmission 114. The transmission 114 has many of the same components as the transmission 14. Components that are the same are identified with the same reference numbers as in FIGS. 1 and 2, and function as described with respect to FIGS. 1 and 2. The outer casings 45, 53 of the motor/generators 40, 50 are shown only partially and in phantom in FIG. 3 for clarity in the drawings. The transmission 114 establishes all of the operating modes as described with respect to the transmission 14 by control of the clutches 80, 82, the motor/generator 40 and 50, and the engine 12.

The transmission 114 has a first set of intermeshing gears 160 and a second set of intermeshing gears 170 that are different than the respective sets of intermeshing gears 60 and 70. The first set of intermeshing gears 160 includes the first gear 62 connected by the sleeve shaft 63 for common rotation with the sun gear member 32, the second gear 64 connected for rotation with the rotor shaft 57 of motor/generator 50, an idler gear 165 meshing with both gears 62 and 64, and a gear 166 meshing with the idler gear 165 and connected for rotation with the shaft 61. The idler gear 165 rotates about an axis of rotation 187. The gears 62 and 64 are oriented generally in vertical alignment with one another, and with the idler gear 165 so that the axes of rotation 39 and 65 are positioned differently relative to one another than in the embodiment of FIGS. 1 and 2.

The transmission 114 has a second set of intermeshing gears 170 that includes a first gear 172 operatively connectable for rotation with the first interconnecting member 38 when the second torque-transmitting mechanism 82 is engaged. A gear 178 is connectable for common rotation with the gear 166 when the first torque-transmitting mechanism 80 is engaged. Gear 76 meshes with both gears 172 and 178.

Thus, in the first embodiment of FIGS. 1 and 2, the transmission 14 has an idler gear 74 in the second set of intermeshing gears 70, while in the second embodiment of FIGS. 3 and 4, the transmission 114 has an idler gear 165 in the first set of intermeshing gears 160. The transmission 14 establishes a generally flat rear, which is the right side of the transmission 14 in FIG. 2, while the second transmission 114 has a generally flat front, which is the left side of the transmission 114 in FIG. 4. That is, the rearmost edges of the motor/generator 50, the gear 66, and the gear 76 are generally aligned in FIG. 2. The foremost portions of the motor/generators 40 and 50 are generally aligned in FIG. 4.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A hybrid powertrain comprising:
   only two planetary gear sets including a first planetary gear set and a second planetary gear set with two members of the first planetary gear set connected for common rotation with two members of the second planetary gear set;
   a first motor/generator and a second motor/generator; wherein the first motor/generator is connected for common rotation with a member of the first planetary gear set and a member of the second planetary gear set;
   an input member connected to another member of the first planetary gear set;
   an output member;
   a first set of intermeshing gears including a first gear and a second gear; wherein the first gear is connected for common rotation with one of the members of the second planetary gear set and the second gear is driven by the second motor/generator;
   a second set of intermeshing gears including another gear driving the output member;
   a first clutch selectively engageable to transfer torque from the planetary gear sets to the output member through both of the first set of intermeshing gears and the second set of intermeshing gears to establish an input-split operating mode; and
   a second clutch selectively engageable to transfer torque from the planetary gear sets to the output member through the second set of intermeshing gears to establish a compound-split operating mode.

2. The hybrid powertrain of claim 1, wherein the members of the first planetary gear set include a sun gear member, a carrier member and a ring gear member; wherein the members of the second planetary gear set include another sun gear member, another carrier member, and another ring gear member;
   wherein the sun gear member of the first planetary gear set is connected for common rotation with the ring gear member of the second planetary gear set and with the first motor/generator; wherein the ring gear member of the first planetary gear set is connected for common rotation with the input member; wherein the carrier member of the first planetary gear set is connected for common rotation with the carrier member of the second planetary gear set; and wherein the sun gear member of the second planetary gear set is connected for common rotation with the first gear of the first set of intermeshing gears.

3. The hybrid powertrain of claim 1, wherein the first motor/generator radially surrounds at least a portion of one of the planetary gear sets.

4. The hybrid powertrain of claim 1, wherein the planetary gear sets and the first motor/generator rotate about a first axis of rotation; and wherein the second motor/generator rotates about a second axis of rotation.

5. The hybrid powertrain of claim 1, wherein the planetary gear sets and the first motor/generator rotate about a first axis of rotation; wherein the second motor/generator rotates about a second axis of rotation; wherein the output member defines a third axis of rotation; wherein gears of the first and the second set of intermeshing gears selectively connected for common rotation by engagement of the first clutch define a fourth axis of rotation; and wherein the first axis of rotation, the third axis of rotation, and the fourth axis of rotation are arranged in a triangular formation.

6. The hybrid powertrain of claim 1, wherein an electric-only operating mode is provided when the first torque-transmitting mechanism is engaged, the second motor/generator functions as a motor, and the first motor/generator functions as a motor or as a generator as necessary to prevent the input member from rotating.

7. The hybrid powertrain of claim 1, wherein the powertrain establishes a first range of speed ratios between the input member and the output member during the input-split operating mode from launch to a mechanical point achieved during the input-split operating mode; wherein the powertrain establishes a second range of speed ratios between the input member and the output member during the compound-split operating mode between two mechanical points achieved during the compound-split operating mode; and wherein the first range of speed ratios is disjoint from the second range of speed ratios.

8. The hybrid powertrain of claim 1, wherein a ratio of the speed of the output member to the speed of the input member is fixed when both of the torque-transmitting mechanisms are engaged.

9. A hybrid powertrain comprising:
a two-mode electrically-variable transmission having:
only two planetary gear sets defining a first axis of rotation; each planetary gear set having a first, a second, and a third member;
a first interconnecting member having an annular shaft and connecting the second member of the first planetary gear set for common rotation with the second member of the second planetary gear set;
a second interconnecting member connecting a first member of the first planetary gear set for common rotation with the third member of the second planetary gear set;
a first and a second set of intermeshing gears arranged in two different planes and having gears rotatable about different axes of rotation that are offset from the first axis of rotation;
an input member connected for common rotation with a member of the first planetary gear set and concentrically surrounded by the sleeve shaft of the first interconnecting member;
an output member driven by one of the gears of the second set of intermeshing gears and coaxial with one of the axes of rotation offset from the first axis of rotation;
a first motor/generator connected for common rotation with the second interconnecting member;
a second motor/generator connected for common rotation with one of the gears of the first set of intermeshing gears and coaxial with one of the different axes of rotation that is offset from the first axis of rotation;
a first torque-transmitting mechanism selectively engageable to connect one of the gears of the first set of intermeshing gears for common rotation with one of the gears of the second set of intermeshing gears to thereby establish an input-split operating mode; and
a second torque-transmitting mechanism selectively engageable to connect a different one of the gears of the second set of intermeshing gears for common rotation with the annular shaft of the first interconnecting member to thereby establish a compound-split operating mode.

10. The hybrid powertrain of claim 9, wherein the second set of intermeshing gears includes an idler gear meshing with the different one of the gears of the second set of intermeshing gears that is connected with the sleeve shaft of the first interconnecting member by the second torque-transmitting mechanism; wherein the idler gear meshes with the gear that drives the output member; and wherein said one of the gears of the second set of intermeshing gears that is connected by the first torque-transmitting mechanism with said one of the gears of the first set of intermeshing gears also meshes with the gear that drives the output member.

11. The hybrid powertrain of claim 9, wherein the first set of intermeshing gears includes:
a first gear connected for common rotation with the first member of the second planetary gear set by a sleeve shaft that is not connected for common rotation with a member of the first planetary gear set;
an idler gear meshing with the first gear; and
wherein the idler gear meshes with the gear connected for common rotation with the second motor/generator and also meshes with the gear connected with one of the gears of the second set of intermeshing gears by the first torque-transmitting mechanism.

12. The hybrid powertrain of claim 11, wherein the members of the first planetary gear set include a sun gear member, a carrier member and a ring gear member; wherein the members of the second planetary gear set include another sun gear member, another carrier member, and another ring gear member;
wherein the second interconnecting member connects the sun gear member of the first planetary gear set for common rotation with the ring gear member of the second planetary gear set and with the first motor/generator; wherein the third member of the first planetary gear set connected for common rotation with the input member is the ring gear member of the first planetary gear set;
wherein the second interconnecting member connects the carrier member of the first planetary gear set for common rotation with the carrier member of the second planetary gear set; and wherein the first member of the second planetary gear set is the sun gear member of the second planetary gear set.

13. The hybrid powertrain of claim 9, wherein the input member extends through and is concentrically surrounded by the first motor/generator, the first planetary gear set, the second planetary gear set, and the second torque-transmitting mechanism.

14. The hybrid powertrain of claim 9, wherein the first motor/generator radially surrounds at least a portion of one of the planetary gear sets; and
wherein the second motor/generator is substantially aligned with the first motor/generator radially outward from the first axis of rotation.

15. The hybrid powertrain of claim 9, wherein one of the sets of intermeshing gears includes an idler gear.

16. The hybrid powertrain of claim 9, wherein the planetary gear sets are substantially identical.

17. The hybrid powertrain of claim 9, wherein a ratio of speed of the output member to speed of the input member is fixed when both of the torque-transmitting mechanisms are engaged.

18. The hybrid powertrain of claim 9, wherein an electric-only operating mode is provided when the first torque-transmitting mechanism is engaged, the second motor/generator functions as a motor, and the first motor/generator freewheels.

19. The hybrid powertrain of claim 9, wherein a first range of speed ratios is provided between the input member and the output member during the input-split operating mode from launch to a mechanical point achieved during the input-split operating mode; wherein a second range of speed ratios is provided between the input member and the output member during the compound-split operating mode between two mechanical points achieved during the compound-split operating mode; and wherein the first range of speed ratios is disjoint from the second range of speed ratios.

20. A hybrid powertrain comprising:
a compound planetary gear set with multiple members only four of which are capable of attaining distinct rotational speeds;
a first motor/generator and a second motor/generator; wherein the first motor/generator is connected for common rotation with two of the members of the compound planetary gear set;
an input member connected to a different one of the members of the compound planetary gear set than the first motor/generator;
an output member;
a first set of intermeshing gears including a first gear and a second gear; wherein the first gear is connected for common rotation with one of the members of the compound planetary gear set and the second gear is driven by the second motor/generator;
a second set of intermeshing gears including another gear driving the output member;
a first clutch selectively engageable to transfer torque from the compound planetary gear set to the output member through both of the first set of intermeshing gears and the second set of intermeshing gears to establish an input-split operating mode; and
a second clutch selectively engageable to transfer torque from the compound planetary gear set to the output member through the second set of intermeshing gears to establish a compound-split operating mode.

* * * * *